United States Patent [19]

Hermann

[11] Patent Number: 5,018,593
[45] Date of Patent: May 28, 1991

[54] HIGH LIFT TAG AXLE FOR TRUCKS

[75] Inventor: Lorin E. Hermann, Springville, N.Y.

[73] Assignee: Ashford Concrete, Inc., Springville, N.Y.

[21] Appl. No.: 470,896

[22] Filed: Jan. 26, 1990

[51] Int. Cl.⁵ ............................................. B62D 61/12
[52] U.S. Cl. ................................. 180/24.02; 280/704; 280/43.23
[58] Field of Search ....................... 180/24.02; 280/704, 280/43.17, 43.22, 764.1, 43.23, 405.1

[56] References Cited

U.S. PATENT DOCUMENTS

| | | | |
|---|---|---|---|
| 3,544,127 | 12/1970 | Dobson | 280/43.17 |
| 3,877,715 | 4/1975 | Thayer et al. | 180/24.02 |
| 4,065,153 | 12/1977 | Pringle | 280/704 |
| 4,079,798 | 3/1978 | Ferris | 280/405.1 |
| 4,102,424 | 7/1978 | Heinze | 180/24.02 |
| 4,588,201 | 5/1986 | Mohrbacker | 280/405.1 |
| 4,705,133 | 11/1987 | Christenson et al. | 280/704 |
| 4,762,421 | 8/1988 | Christenson et al. | 280/704 |
| 4,848,783 | 7/1989 | Christenson et al. | 280/704 |

FOREIGN PATENT DOCUMENTS 415450 8/1934 United Kingdom ............ 280/43.17

Primary Examiner—Richard A. Bertsch
Assistant Examiner—Tamara L. Finlay
Attorney, Agent, or Firm—Waldron & Associates

[57] ABSTRACT

A high lift tag axle for a concrete mixer truck or the like is pivotally attached to the rear of the truck through a pair of tag arms each having a lever arm, with a linkage arrangement interconnecting each lever arm to the truck frame, and a hydraulic cylinder connected to said linkage arrangement to align the linkage arrangement in a plane sufficient to lock the lift axle in a downward position where the wheels engage the road surface, and whereby the hydraulic cylinder can pivot as the linkage arrangement sufficient to pivot the tag axle into a position whereby the wheels are raised off of the road surface.

18 Claims, 4 Drawing Sheets

HIGH LIFT TAG AXLE FOR TRUCKS

BACKGROUND OF THE INVENTION

1. Field of the Invention

This invention relates generally to vehicular trucks, and more to a new and improved high lift tag axle for transit mixers, i.e. concrete mixer trucks and the like, which will not only permit an increase in the legal payload of the truck or mixer unit, but does not rely on a complicated hydraulic system to hold the tag axle in either the lowered or raised position. Rather, the tag axle of this invention utilizes a mechanical lock-down arrangement so that all ground forces are transmitted through the physical structure thereof and not the hydraulic system. In addition, the tag axle of this invention can be raised to an exceptionally high position so that it is not obstructive to complete access to the rear of the truck for the purpose of discharging concrete and the like.

2. The Prior Art

It is well known that most federal, state and local highways have load limits which limit the weight of vehicles traveling thereon. While there are total overall weight limits per vehicle, many highways regulations also provide for load limits per vehicle axle. This is particularly true in the case of bridges where in addition to overall weight limits per vehicle, there are also weight limits to prevent localized weight concentrations. In this regard, the Federal Highway Administration has issued a "Bridge Gross Weight Formula", commonly referred to as the "bridge formula", which specifies load limits on the basis of bridge load carrying classifications, and provides formulas for determining load limits based not only on the basis of weight per axle, but also on the basis of distances between axles and the total over-all span between the front axle and the rearmost axle. The essence of the bridge formula is to prevent heavy loads from being concentrated on few closely spaced axles. Therefore, the total overall weight limit for many truck designs can be increased, to a limit, if the weight is spread over more axles spread further apart. While the federal bridge formula is applicable only to federal highway, many states have adopted the bridge formula into their own highway load limit regulations.

The use of auxiliary axles on trucks for providing additional load-bearing wheels is well known in the art. Particularly on tandem and tri-axle trucks, it is common practice to provide a hydraulic or spring actuated lift for one of the rear axles, so that it can or will be lifted from the road surface when the load is light and the additional load-bearing wheels are not needed.

In the case of transit mixers, i.e. concrete mixer trucks, there has been considerable interest and development in the art of "lift axles" or "tag axles", which are separate axle assemblies added to the rear of the truck. Such tag axles include a mechanism for lowering the unit so that the wheels will engage the road surface at some point behind the rearmost tandem axle, so that the legal load carrying capacity of the transit mixer can be significantly increased and yet satisfy the bridge formula. This increased load carrying capacity is effected not only by virtue of the fact that the load is spread over more axles, but also because the distance between the front and rearmost axles is significantly increased. Utilization of such a tag axle can permit a conventional tandem axle transit mixer, having a legal load limit of about seven cubic yard of concrete, to be legally increased to nine or even ten cubic yards.

Ideally, the tag axle is utilized to carry such heavy loads only when the transit mixer is traveling on public roadways and needed for the purpose satisfying the bridge formula or other load limits. In off-the-road use, however, such tag axles are not beneficial, and are therefore provided with means for lifting the tag axle from the roadway surface. In lifting the tag axle off the roadway, the load on the front axle is reduced to permit easier steering, the load is increased on the drive axles to increase traction, the truck's maneuverability is increased by reducing its overall wheel base, and the truck can be positioned closer to forms and other unloading sites to facilitate the discharge of concrete.

One disadvantage of some tag axles in current use, is that they cannot be raised sufficiently to get them out of the way to facilitate access to the discharge end of the truck. These tag axle units are based on folding linkage which hydraulically pulls the tag axle up under the discharge chute only inches from the road surface, so that the operator must work around the tag axle in discharging the concrete from the mixer. Other designs are known, however, which do raise the tag axle well above the discharge chute and above the head of the operator so that it is not an obstruction to the operator's discharge activities.

All the tag axles in current use utilize a hydraulic system for activating the tag axle from one position to the other, and in addition rely on the hydraulic system for maintaining the tag axle in contact with the road surface, if not also for maintaining the tag axle in its lifted, off the road position. In fact, many of the tag axle units available commercially, rely on the hydraulic system to provide a "spring" suspension or shock absorbing feature to the tag axle, so that the ground loads are transmitted to, and borne entirely by, the hydraulic system. These hydraulic systems must therefore be adapted to very heavy duty use, and typically include pressure regulating controls so that the "hold down" pressure applied to the tag axle is adjustable for controlling that pressure in proportion to the load weight on the truck. It is readily apparent that the demands on the hydraulic system are significant, as the system is constantly active and under excessive pressure while the tag axle is being utilized, if not also while the tag axle is in the raised, off the road position. Accordingly, such tag axles tend to be rather expensive, and subject to frequent hydraulic system difficulties, failure and repairs.

SUMMARY OF THE INVENTION

This invention is predicated upon the conception and development of a simple and inexpensive improved tag axle, which, although hydraulically operated to move it from one position to the other, does not rely on the hydraulic system to maintain the tag axle in either position. Instead, a unique hydraulically operated linkage system is utilized to raise and lower the tag axle as necessary to move it from one position to the other, while the linkage system itself locks the tag axle into position for engagement with the road surface with virtually no load on the hydraulic system once it is in proper position. In the raised, off the road position, the wheels and axle are raised high above the operator's head so that they will not be an obstruction, and such that the tag axle's weight is borne entirely by its steel support structure, again with virtually no load on the hydraulic system. Accordingly, the unique tag axle of this invention will permit the use of a far less robust and costly hydraulic system consisting of one or two simple hydraulic cylinders, without the need for any pressure regulating controls associated with the hydraulic system.

DETAILED DESCRIPTION OF THE INVENTION

Figure 1:
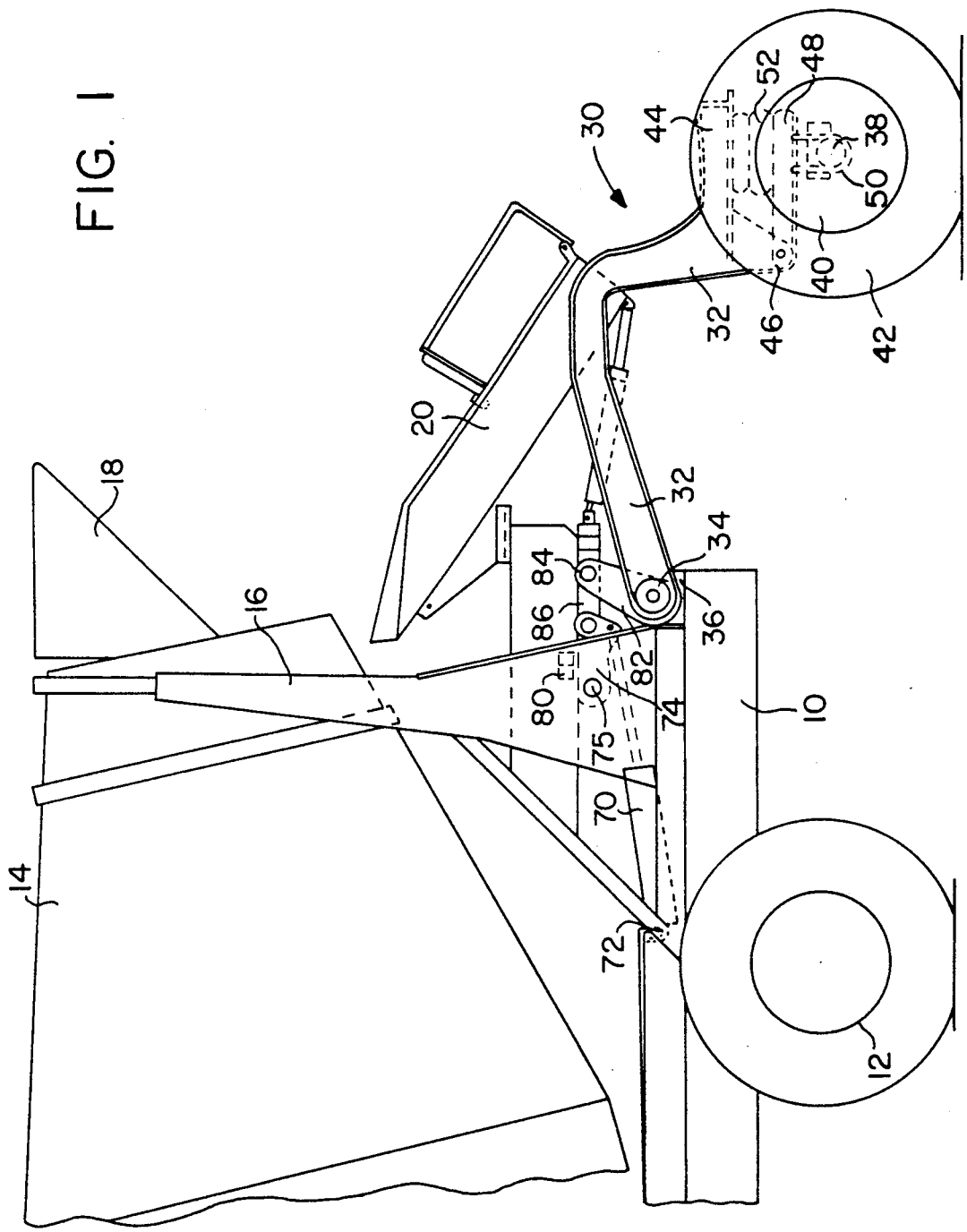
FIG. 1 is a partial side view of a concrete mixer truck having a tag axle according to this invention, illustrating the tag axle in the down position as utilized for increasing the payload of the truck.
Figure 2:
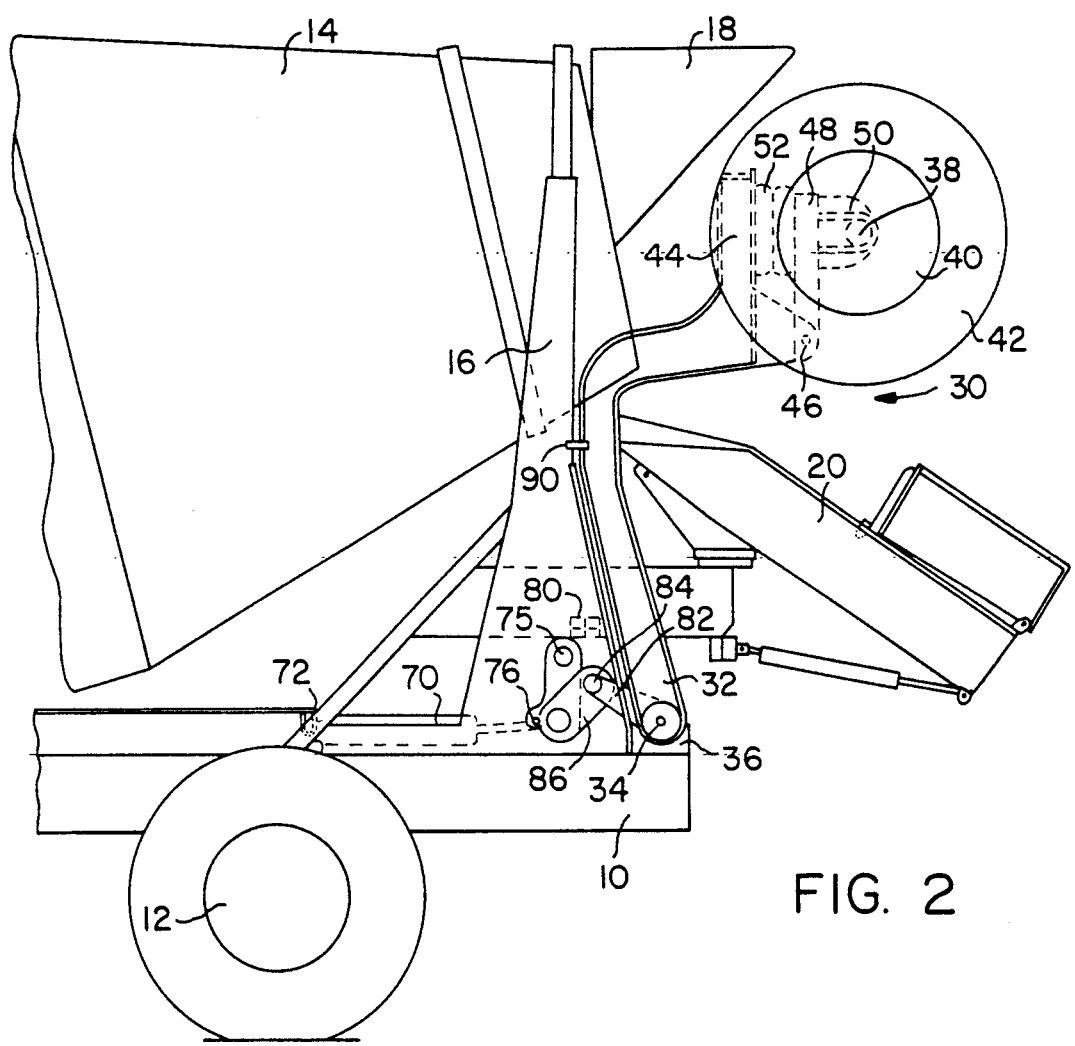
FIG. 2 is substantially the same as FIG. 1 except that the tag axle is in the raised, off of the road position.
Figure 3:
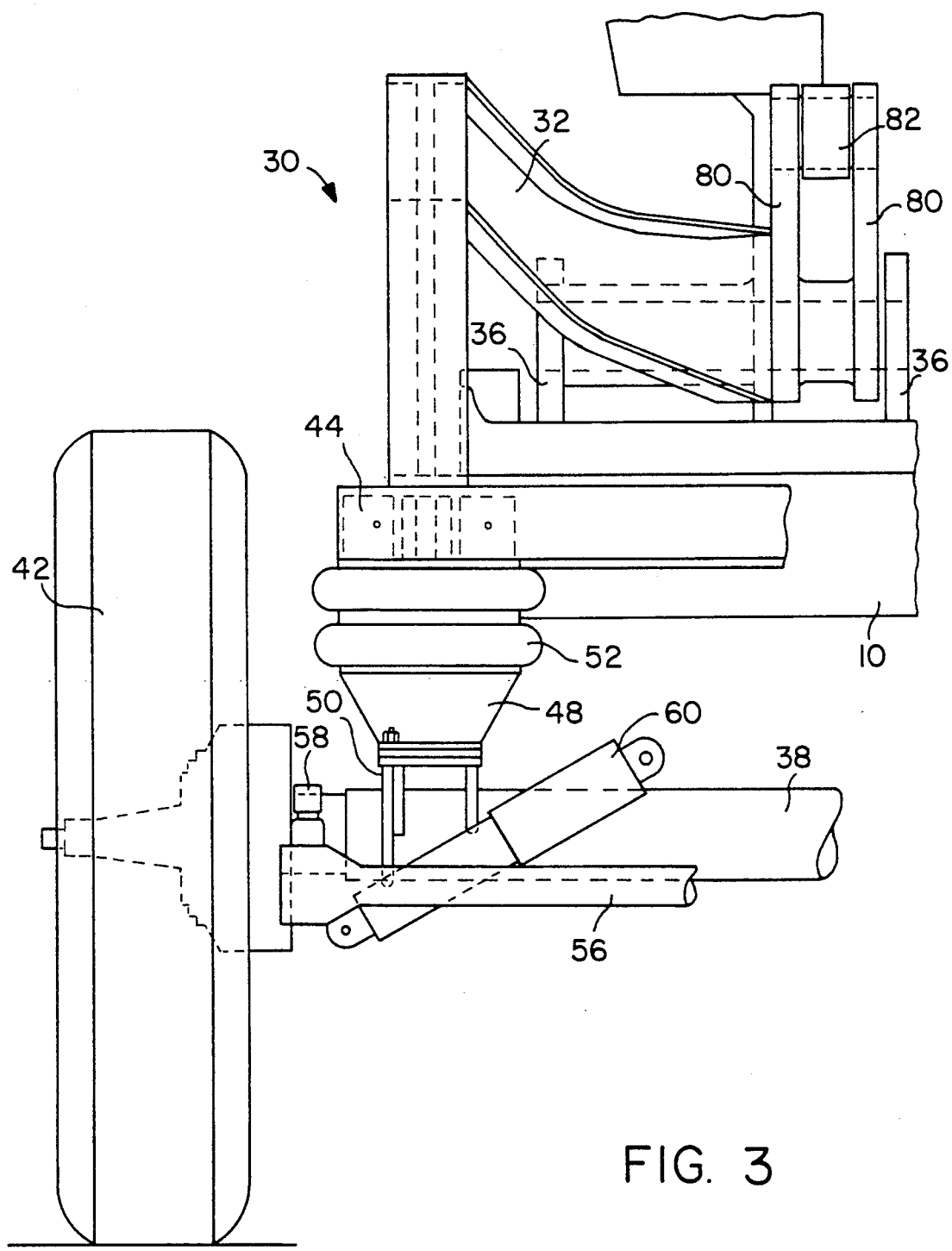
FIG. 3 is a partial rear view of the concrete mixer truck illustrated in FIG. 1 showing the tag axle in the down, on the road position.

Reference to FIG. 1-3 will illustrate one embodiment of this invention wherein a partial side view of a concrete mixer truck is illustrated, showing the extreme rearward portion comprising the truck frame 10, the rearmost wheels 12, the rearward portion of concrete mixer 14, the rear mixer bearing support 16, the mixer charging hopper 18, and the mixer discharge chute 20, all of which are pursuant to prior art practices. The tag axle according to this invention is shown at 30, which comprises in part, a pair of tag arms 32 pivotally connected through pins 34 to vertical plates 36 welded to the rearmost portions of the truck frame 10. While only one such tag arm 32, pin 34 and so forth are shown in any of the figures, it should be appreciated that only one side of the truck is illustrated. Therefore, most elements of the tag axle assembly described herein will, except for the wheel axle 38, consist of matching left and right elements, unless otherwise noted. The drawings, however, illustrate only the left element on the left side of the truck.

While the forward ends of tag arms 32 are pivotally connected to the truck frame 10 as noted above, the rearward portions support the tag wheels 40 with tires 42 mounted thereon. Tag wheels 40 are rotatably supported on opposite ends of wheel axle 38, which extend from one tag arm 32 to the other. It should be apparent that there is only one wheel axle 38.

The rearward end of each tag arm 32 is provided with a load support extension 44, which extends rearwardly when the tag axle is in the downward position, and a pivot support plate 46 extending downwardly from the forward end of load support extension 44. A pivot arm 48 is pivotally secured to each pivot support plate 46, so that it will extend rearwardly, generally parallel to load support extension 44. Wheel axle 38 is secured to the underside of each pivot arms 48 with U-bolts 50, while pneumatic air bags 52 are secured above wheel axle 38 and positioned between extensions 44 and pivot arms 48. Pneumatic air bags 52 are preferably of the type that can be selectively pressurized so that the load supported by the tag axle can be controlled to the extent desired.

As can be seen, when the tag axle 30 is in the down position to carry its share of the load, the wheels 40 tires 42 and axle 38 will have some freedom to move with respect to the rigid tag arms 32 by virtue of air bags 52 which provide some degree of spring suspension and shock absorption.

As show in FIG. 3, a preferred embodiment of this invention would include self steering capabilities, such as a single tie rod 56, connected to a spindle 58 at each wheel 42, as well as shock absorbers 60. Techniques for providing self steering capabilities to trailer wheels is well known in the prior art, and therefore, need not be detailed here, suffice it to say that the tag axle of this invention may or may not include such a feature, and if it is included, there are several well known techniques for effecting such capabilities. In addition to self steering capabilities, the tag wheels are also preferably provided with brakes (not shown), ideally hydraulic or air brakes connected to, and controlled by, the truck's brake system, as well as fenders and tail lights (not shown). Since such brake systems fenders and tail lights are well known in the prior art, they have not been shown in the attached drawings so that the drawings can be kept as simple as possible to facilitate an understanding of this invention.

Actuation of the tag axle 30 between its downward, on the road position and its upward, off the road position, is effected by hydraulic cylinder or cylinders 70, having a base end pivotally secured to truck frame 10 at pin 72, while its reciprocating end is secured to angular link plates 74 at pin 76. While only one such hydraulic cylinder 70 is all that is necessary, particularly if it is centered between the tag arms 32, two such hydraulic cylinders 70 can be utilized, one each secured adjacent to each tag arm 32, if they are interconnected to operate in unison.

Figure 4:
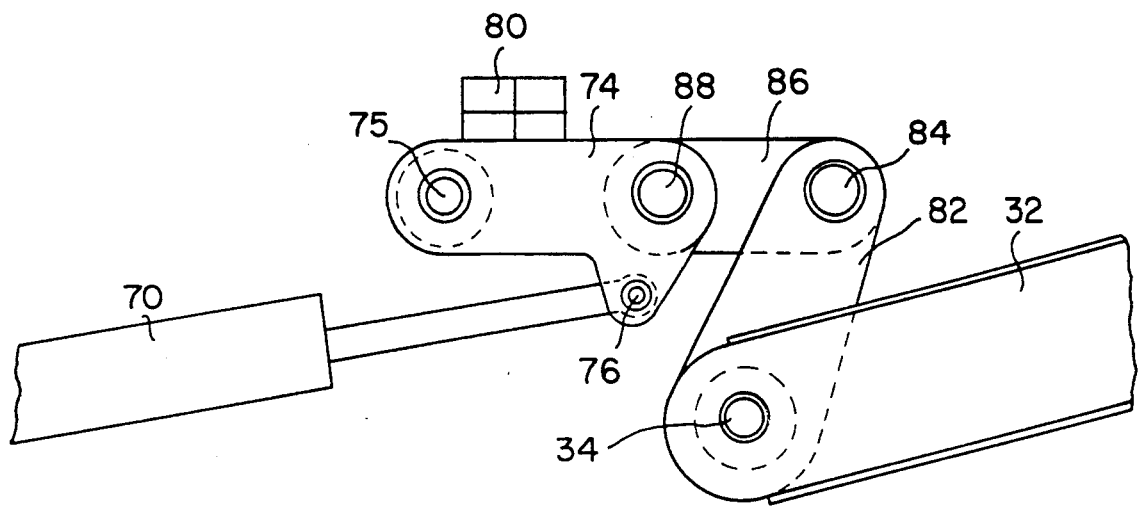
FIG. 4 is a schematic illustration of the activating linkage as positioned to maintain the tag axle in the down position.
Figure 5:
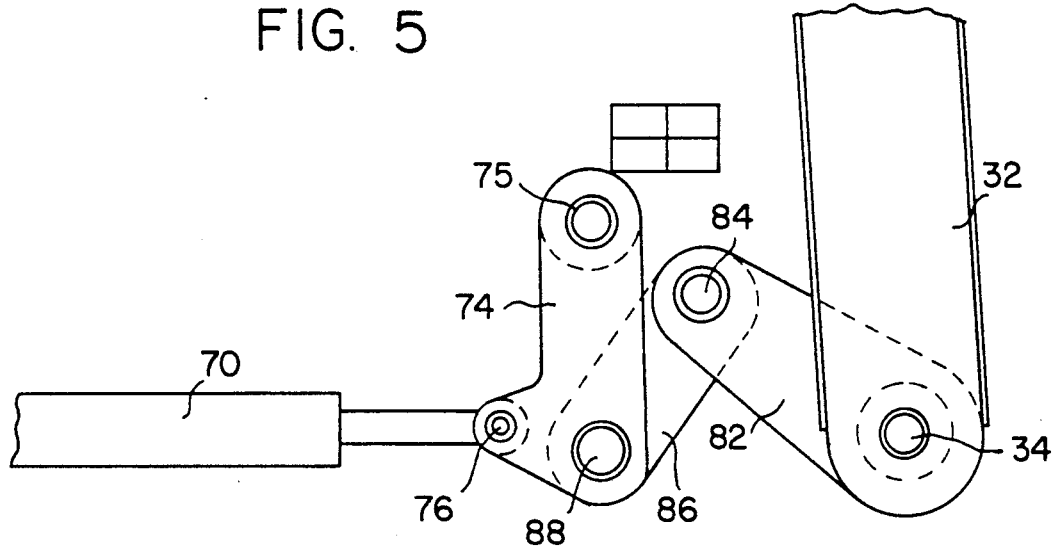
FIG. 5 is substantially the same as FIG. 3 except that it illustrates the linkage as positioned to maintain the tag axle in the up, off of the road position.

While the two extreme positions of all the linkage elements are shown in FIGS. 1 and 2, FIGS. 4 and 5 show the relationship in more detail, with FIG. 4 showing the linkage relationship when the tag axle 30 is in the down position engaged with the roadway, and FIG. 5 showing the linkage relationship when the tag axle 30 is in the up, off the road position. Reference to FIG. 4 will illustrate that when the tag axle is in the downward, on the road position, hydraulic cylinder 70 is in the extended position, so that it has pushed angled link plates 74, pivoting on stationary pins 75, to their fully horizontal position with the upper surfaces of link plates 74 abutting against the lower surface of load stops 80. Load stops 80 can be any sort of solid member secured to truck frame 10 which are adapted to limit the counter-clock movement (as shown from the left side of the truck) of link plates 74 as shown. Preferably, load stops 80 are solid steel blocks presenting a plainer surface against which the upper surface of link plate 74 can by positioned.

With further reference to FIGS. 4 and 5, each tag arm 32 is rigidly secured, such as by welding, to a pivotal lever arm 82, so that both will pivot in unison at pin 34. Since each pivotal lever arm 82 is welded to the associated tag arm 32, these two elements could be formed as a single element if so desired. Is should be apparent therefore, that when lever arms 82 are pivoted in either direction at pins 34 through a given angle, tag arms 32 will pivot therewith through the same angle, or visa versa, as can be seen by contrasting FIG. 4 with FIG. 5. The upper end of lever arms 82, extending away from tag arms 32, are pivotally secured to pins 84, while the rearward ends of link plates 86 are also pivotally secured to pins 84. As should be apparent, any translational movement of link plates 86 pushing or pulling on pins 84, will cause pivotal motion of lever arms 82, as well as tag arms 32. The other ends of link plates 86, i.e. the forward ends, are secured to pins 88, which are also secured to rotatable ends of angled link plates 74.

To explain the operation of the linkage, it should first be appreciated that pins 75 and 34 are rigidly secured to the truck frame so that they cannot move, but will permit rotation of the link plates and arms rotatably secured thereto. Pins 84 and 88, on the other hand, are connected only to the link plates or the lever arm as shown, and therefore, are not only capable of permitting rotational movement of the links and arms secured thereto, but are also subject to translational movement, to the extent permitted by the linkage. As shown in FIG. 4, it can be seen that when the tag axle is in the downward position for engaging the tires 42 with the road surface, angled link plates 74 are being held by hydraulic cylinder 70 against load stops 80, so that pins 88 and 84 are necessarily aligned in a horizontal plane with pins 75. When hydraulic cylinder 70 is activated and withdrawn, angled link plates 74 will be caused to rotate downward, pivoting on pins 75, away from load stops 80 (clockwise as shown) so that pins 88 will move through the same arc, pulling on link plates 86, which in turn pull on pin 84. This movement of pins 84 will cause lever arm 82 and tag arms 32 to rotate the tag axle into an upward position, (counterclockwise as shown). FIG. 5 illustrates the tag axle 30 in its fully raised position, as a result of the above described actions.

In the fully upward position, as shown in FIG. 5, the weight of the tag axle is borne almost entirely by pins 34, so that there is no significant load on hydraulic cylinder 70. The only load on hydraulic cylinder 70, will be the result of those forces which will tend to rotate the tag axle rearwardly, such as wind forces when the truck is in motion, and modest gravitational forces which may result from the fact that the center of mass of the tag axle may not directly over, or forward of, pins 34. These forces on hydraulic cylinder 70 can, however, be completely eliminated by providing a means for locking the tag axle in it upward position, such as a latch or pin 90 which will lock at least one tag arm 32 to the mixer bearing support 16.

In the fully downward position, as illustrated in FIG. 1 and 4, it can be seen there is still no significant load on hydraulic cylinder 70. The load imposed on wheels 40 and tires 42, is transmitted back through tag arms 32 to the above described linkage and load stop 80. Since pins 75, 88 and 84, are aligned in a plane with angled link plates 74 biased against load stop 80, all ground forces acting on the tag axle, will be borne by these members, and the only load on hydraulic cylinder 70 will be that required to keep angled link plates 74 biased against load stop 80. For this reason, it is essential that pins 75, 88 and 84 be aligned in a plane so that any force tending to rotate the tag axle 30, will be absorbed entirely by the linkage and load stop 80, without any tendency to rotate angled link plate 74 away from load stop 80. While the plane in which pins 75, 88 and 84 lie is shown to be horizontal, it is not essential that it be horizontal, as long as the pins can be locked in a plane so that the ground loads are absorbed entirely by the linkage without causing any rotational movement of any link.

Since the above described linkage is preferably duplicated on each side of the truck, duplicate links and pivot arms should be provided, one set on each side of the truck. However, since the linkage members must be properly aligned to operate in unison, single elongated pins 75, 34, 84 and 88 can be utilized which span across the rear of the truck from one set of linkage elements to the other. Use of single pins spanning the rear of the truck will assure that they are properly aligned from left to right. This may be particularly desirable for fixed pins 34 and 75, which must be secured to the truck frame. It is a rather simple matter to mount these rotatable pins, i.e. pins 34 and 75 within bearings secured within housings welded to the truck frame. This will provide the advantage that the links will operate in unison and eliminate the possibility that they could move other than in synchronized unison and thereby cause an undesirable binding and twisting in the tag axle alignment. In the event that only one hydraulic cylinder 70 is utilized, it is preferable that it be spaced midway between the tag arms 32 and associated linkage so that loading thereon will be uniform. In this event it will be necessary that one pin 76 be provided which spans between the pair of angled links 74, with the hydraulic cylinder attached at its midpoint.

While it is of course necessary that suitable bearings be provided at pins 75, 35, 84 and 88 to minimize friction and permit easy rotation of the linkage members on the respective pins, the provision of such bearings is readily within the skill of the art and need not be detailed here.

In operation it can be seen that the tag axle, when put in the downward position with the tires engaged with the road surface, will have the tag arms 32 locked into a preset position, and held in that position by the linkage lock assembly. All ground loads transmitted through the tag arms 32 are shared by the components of the linkage assembly, and not the hydraulic cylinder 70. Once the tag axle is lowered and locked into position, air bags 52 should be pressurized to effect the desired ground load through the axle and tires. The air pressure in air bags 52 is usually set to a value of from 60 to 100 psi depending on the desired ground load, which is usually from 6,000 to 12,000 pounds, which, of course, includes the weight of the tag axle. The air bags 52 also act as shock absorbers eliminating the need for accumulators.

In view of the above disclosure it is apparent that numerous modifications and other embodiments of the tag axle could be made without departing from the spirit of the invention. As already noted, the tag axle can be optionally provided with self-steering capability, wheel brakes, fenders, tail lights and the like. In addition, other forms and shapes of the component parts could be utilized depending on the truck being fitted with the tag axle. While the above description has been limited to the application of a tag axle on a concrete mixer truck, it should be apparent that the tag axle of this invention could be installed on trucks utilized in other forms of service, and the tag axle of this invention should not, therefore, be limited to use on concrete mixer trucks.

In addition to the above, it should be realized that the linkage arrangement as depicted, is only one example of how the linkage can be arranged, as clearly other arrangements could be utilized without departing from the spirit of this invention. For example, the hydraulic cylinder, or what ever means is utilized to pivot the linkage, could be connected to link plate 86 instead of 74, or the pivotal motion could be effected in the opposite direction, so that the load stop 80 is under the linkage. In addition, additional linkage members could be provided if desired for any reason, provided that the pivot pins thereof can be aligned in a plane to lock the tag axle in position as described. While the plane can be positioned in other locations, the plane should of course be sufficiently tangent to the arc of motion of the pin 84 in lever arm 82 so that the linkage will be aligned keep the lever arm 82 from moving. All that is essential is that the tag arms have a lever means for lifting the tag arms, and that a linkage arrangement be secured to that lever which is capable of being locked in a plane sufficient to hold the tag axle in the downward position, while also being pivotal to raise the tag axle. Clearly therefore, there are a great number of differing arrangements that could be created if desired.

What is claimed is:

1. A tag axle for attachment to the rear of a truck comprising, a pair of tag arms having forward and rearward ends adapted to have their forward ends pivotally secured to a rear portion of said truck, a wheel rotatably secured to the rearward end of each tag arm, a lever arm secured to the forward end of each tag arm, at least two link members interconnecting each of said lever arms to said truck whereby one end of one said link member is pivotally connected to said lever arm at a pivotal junction, and another link member is pivotally connected to said truck at a pivotal junction, and said link members are pivotally connected to each other at a pivotal junction, means for pivoting said link members sufficient to align said link members and pivotal junctions in a plane whereby said link members will lock said tag arms in a position sufficient to maintain said wheels in contact with a road surface on which said truck is positioned, and means for pivoting said link members so they are not in a plane and will cause said tag arms to be pivoted upward raising said wheels from the road surface.

2. A tag axle according to claim 1 further including stop means for maintaining said link and pivotal junctions in said plane.

3. A tag axle according to claim 1 in which said means for pivoting said link members to align said link members and pivotal junctions in a plane, and said means for pivoting said link members so they are not in a plane are one and the same means.

4. A tag axle according to claim 3 in which said means is a hydraulic cylinder.

5. A tag axle according to claim 4 in which said hydraulic cylinder has a base end pivotally secured to said truck, and a reciprocating end pivotally secured to one of said link members.

6. A tag axle according to claim 1 in which each of said pivotal junctions is a pin.

7. A tag axle according to claim 1 in which said wheels are rotatably mounted onto opposite ends of an axle secured transversely to the rearward ends of said tag arms.

8. A tag axle according to claim 7 in which an air bag is interposed between said axle and each of said tag arms.

9. A tag axle according to claim 1 in which said tag arms can be raised to a an essentially vertical position so that its weight is borne primarily by said truck.

10. A concrete mixer truck or the like having a frame and a high lift tag axle secured behind said frame, said tag axle comprising a pair of tag arms having forward and rearward ends, said forward ends pivotally secured to a rear portion of said frame, a wheel rotatably secured to the rearward end of each tag arm, a lever arm secured to the forward end of each tag arm, at least two link members interconnecting each of said lever arms to said frame whereby one end of one said link member is pivotally connected to said lever arm at a pivotal junction, and another link member is pivotally connected to said frame at a pivotal junction, and said link members are pivotally connected to each other at a pivotal junction, means for pivoting said link members sufficient to align said link members and pivotal junctions in a plane whereby said link members will lock said tag arms in a position sufficient to maintain said wheels in contact with a road surface on which said truck is positioned, and means for pivoting said link members so they are not in a plane and will cause said tag arms to be pivoted upward raising said wheels from the road surface.

11. A truck according to claim 10 further including stop means for maintaining said link and pivotal junctions in said plane.

12. A truck according to claim 10 in which said means for pivoting said link members to align said link members and pivotal junctions in a plane, and said means for pivoting said link members so they are not in a plane are one and the same means.

13. A truck according to claim 12 in which said means is a hydraulic cylinder.

14. A truck according to claim 13 in which said hydraulic cylinder has a base end pivotally secured to said frame, and a reciprocating end pivotally secured to one of said link members.

15. A tag axle according to claim 10 is which each of said pivotal junctions is a pin.

16. A truck according to claim 10 in which said wheels are rotatably mounted onto opposite ends of an axle secured transversely to the rearward ends of said tag arms.

17. A truck according to claim 16 in which an air bag is interposed between said axle and each of said tag arms.

18. A truck according to claim 10 in which said tag arms can be raised to a an essentially vertical position so that its weight is borne primarily by said frame.

* * * * *